United States Patent [19]
Logie

[11] 4,012,880
[45] Mar. 22, 1977

[54] PARTITION SYSTEM

[75] Inventor: Charles F. Logie, Spring Lake, Mich.

[73] Assignee: American Store Equipment Corporation, Muskegon, Mich.

[22] Filed: Apr. 28, 1976

[21] Appl. No.: 681,262

[52] U.S. Cl. .................... 52/585; 52/285; 52/36; 52/127; 52/584

[51] Int. Cl.[2] .......................... E04B 1/48

[58] Field of Search ............ 52/753 C, 583, 585, 52/754–756, 753 F, 285, 584; 403/108, 292

[56] References Cited
UNITED STATES PATENTS

| | | | |
|---|---|---|---|
| 2,687,268 | 8/1954 | Hawes | 403/108 |
| 3,798,860 | 3/1974 | Mason | 52/585 |

Primary Examiner—John E. Murtagh
Attorney, Agent, or Firm—Price, Heneveld, Huizenga & Cooper

[57] ABSTRACT

The specification discloses a partition system for subdividing large rooms or work areas wherein shelving support apparatus may be selectively incorporated between or at the ends or sides of the individual panels without physical modification or alteration of the panels. The panel connection apparatus includes spaced apertures which are used alternately with securing fasteners depending on the inclusion or removal of the slotted or other shelf supports. The outward appearance of the panels themselves remains unchanged regardless of whether or not the shelf supports are included. If desired, the system may include a panel wedging system for firm, secure support such as that disclosed in commonly assigned U.S. Pat. No. 3,884,002.

24 Claims, 14 Drawing Figures

PARTITION SYSTEM

BACKGROUND OF THE INVENTION

This invention relates to partition systems for dividing large rooms, office spaces, or the like into smaller areas with movable, portable panels or partitions and, more particularly, to a system of connecting such partitions or panels while including brackets or other elements for supporting shelves or other work surfaces in conjunction with such panels and partitions.

Many systems are available for joining and supporting movable partitions and panels in various arrangements to subdivide large areas or rooms into smaller work areas or the like. One such system is disclosed in U.S. Pat. No. 3,844,002 issued May 20, 1975, to Charles F. Logie and assigned to American Store Equipment Corporation, the same assignee as the present invention. In the system of U.S. Pat. No. 3,884,002, movable partitions or panels are joined together by one or more connecting pins extending between end or side surfaces of the panels, the connecting pins being secured in place by threaded fasteners inserted through the sides of the panels. A particular feature of that system is the inclusion of tapered heads on such fasteners which mate with tapered countersunk areas in the apertures in the panels through which the fasteners are received for wedging the joined panels tightly together.

In certain applications of prior partition and panel systems, and especially that disclosed in the above-described U.S. Pat. No. 3,844,002, it has been desired to include shelving, work panels, or other work surfaces along the generally vertical sides of such panels or partitions. However, the provision of protruding flanges or supports, apertures, recesses, or other supporting mechanisms extending from or into the actual side surfaces of the panels themselves has been undesirable both because such additional structure can weaken the structural integrity of the panels and because it detracts from the aesthetic qualities of the panels. When no shelving is desired, such structure has been difficult to conceal. Moreover, supporting such shelving or work surfaces from free edges of the panels, or from intermediate edges of the panels which are abutting and adjacent one another when the system is assembled, has been inconvenient because of the difficulty in suspending such shelving entirely from top or bottom free edges or because of disruption of the normal panel joinder apparatus intermediate the panels. Many partitions are manufactured with slotted standards incorporated at each end of the panel as standard features. Shelves are suspended on the slotted standards. When no shelves are desired, however, the slotted standards represent a fairly substantial and unwanted built-in expense.

Accordingly, the provision of adequate shelf or other work surface supporting apparatus in partition and panel systems such as that disclosed in U.S. Pat. No. 3,884,002 has been a significant problem. The present invention provides a solution to that problem and includes apparatus for both connecting partition panels to like panels or wall or other surfaces, as well as apparatus for supporting shelving and other work surfaces along such partition panels.

SUMMARY OF THE INVENTION

The present invention provides a partition system in which shelf-supporting means can be incorporated at the option of the customer. Provision is made for incorporating brackets and other hardware for supporting shelving and other work surfaces over the side surfaces of such panels without any physical alteration or modification of the panels themselves. In its basic form, the invention includes spaced apertures in each of the pins used to connect the panels in various arrangements. The apertures are engaged alternately by fasteners depending on the inclusion or removal of a shelving bracket or standard between the panels. Thus, the same panels and the same panel joining pins can be used with or without the inclusion of shelf supporting standards.

These and other objects, advantages, purposes, and features of the invention will become more apparent from a study of the following description taken in conjunction with the drawings.

DESCRIPTION OF THE PREFERRED EMBODIMENTS

Figure 1:
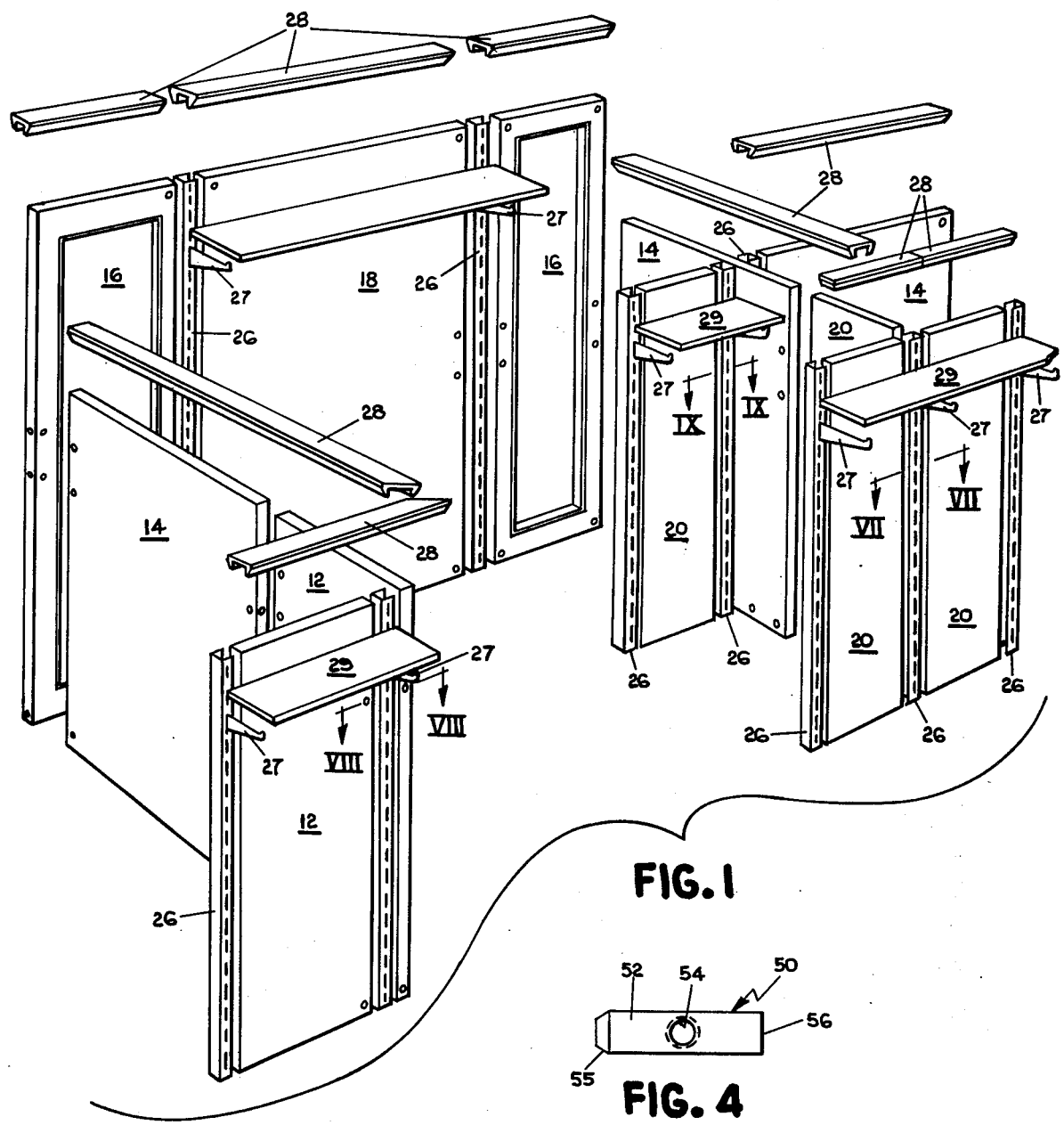
FIG. 1 is an exploded, perspective view of the partition system of the present invention illustrating various arrangements of the individual panel elements with shelving support brackets included therebetween.
Figure 4:
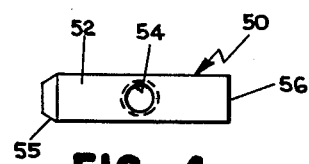
FIG. 4 is a side elevation of a third form of a connecting pin of the present invention.

Referring now to the drawings in greater detail, FIG. 1 illustrates a typical partition arrangement which may be formed utilizing the panels and connection apparatus of the present invention. The panels are formed in various heights and widths such as those shown at 12, 14, 16, 18, and 20. Each of the panels has a thickness less than its height and width and is formed from wood, compressed composition material or the like. The panels are typically rectangular and include end edges 22 which are oriented generally vertically and receive the connection apparatus for supporting and joining the panels together. Typically, three or four elongated connecting pins and their associated fasteners are spaced vertically along the panels. Additionally, any shelving support channel brackets 26 are inserted and secured between the vertically oriented end edges 22 as is more fully described below. The free top edges of the panels may be capped with channel-like top edge moldings 28 or the like. The channel-like shelving support brackets 26 when inserted on either end edge 22 of a panel are used to support cantilever type shelf arms 27 and generally horizontal shelves 29 as shown in FIG. 1.

Figure 11:
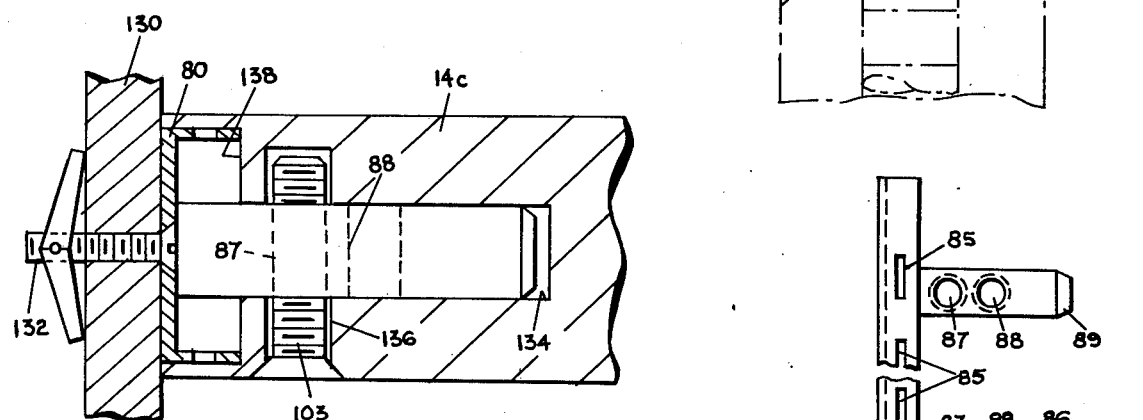
FIG. 11 is a fragmentary, sectional, plan view similar to FIG. 10 but illustrating a modified form of a panel element with a shelving support bracket recessed in one end for securing the panel element to a wall.
Figure 12:
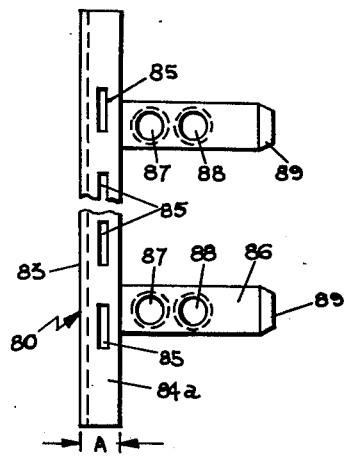
FIG. 12 is a broken, side elevation of one of the slotted, shelving support brackets utilized in the present partition system.
Figure 13:
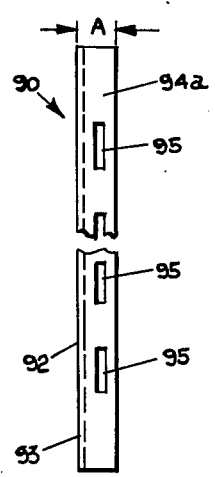
FIG. 13 is a broken, side elevation of another slotted, shelving support bracket used in the present partition system.

Referring now to the remaining figures, the connecting pins shown in FIGS. 2–6 and the slotted, shelving channel brackets or standards shown in FIGS. 12 and 13 are used to arrange the partition panel elements 12–20 in the various relationships shown in FIG. 1. Certain of the joints between the panels, brackets, and pins are specifically illustrated in FIGS. 71   11 and 14.

Figure 2:
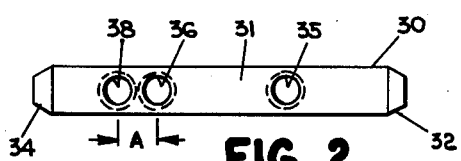
FIG. 2 is a side elevation of a first form of the connecting pin used to join the panel elements of the present invention.
Figure 14:
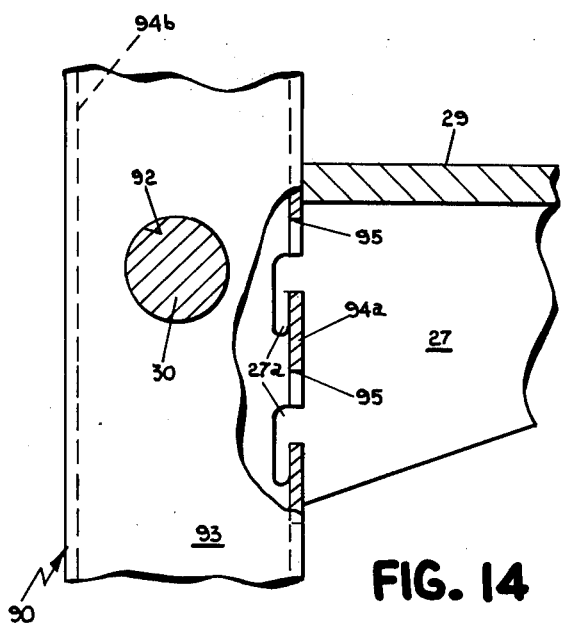
FIG. 14 is a fragmentary, side elevation, shown partially in cross section, illustrating the attachment of a cantilevered, shelving support arm on one of the slotted, shelving support brackets used in the present invention.

Five embodiments of the connecting pins are utilized to arrange the panel elements. As is shown in FIG. 2, the first type 30 includes an elongated, rectilinear, right cylindrical body or rod 31 having beveled or chamfered end edges 32, 34 and a series of threaded apertures or through bores extending entirely therethrough generally transverse to the longitudinal axis of the pin. A single aperture 35 is generally centered in the right half of the pin 30 while apertures 36 and 38 are spaced apart a distance A along the axis of the pin in the left half of the pin 30. Distance A corresponds to the thickness of a slotted standard or channel bracket 80 or 90 (FIGS. 13 and 14). In accordance with the concept of the invention, the spaced apertures 36, 38 alternately receive a threaded screw or fastener through a securing aperture in a side surface of one of the panel elements to secure the panel elements together depending on whether a standard or bracket 80 or 90 is received between the panels (see FIG. 7).

Figure 8:
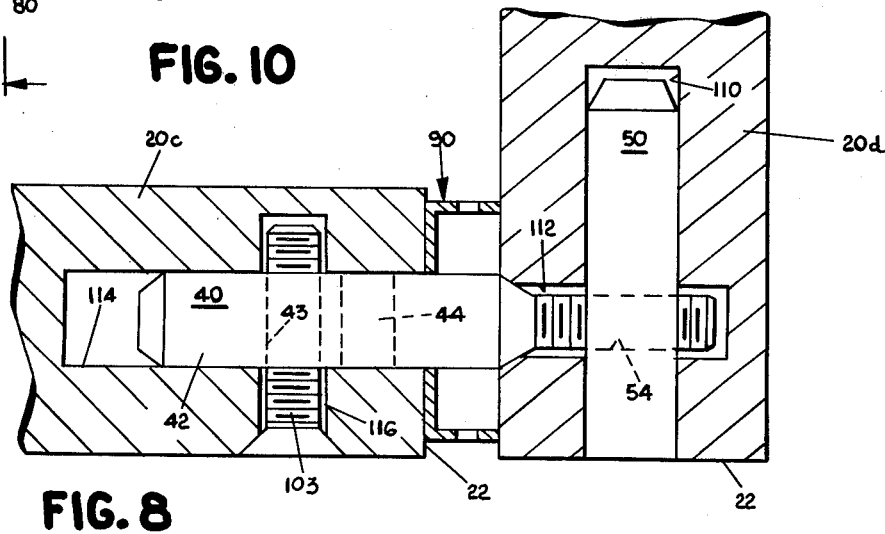
FIG. 8 is a fragmentary, sectional, plan view of two partition panel elements joined at right angles to one another including a shelving support bracket therebetween taken along plane VIII—VIII of FIG. 1.

Other embodiments of the connecting pins include pins 40 and 50 which are utilized together to secure one panel element at a right angle to the side surface of another panel element (see FIG. 8). Pin 40 is an elongated rod-like pin having a rectilinear, right, circular, cylindrical body portion 42 including a pair of threaded screw bores or apertures 43, 44 spaced apart along the axis of the pin by the distance A and generally centered in body portion 42. The left-hand end 45 is beveled or chamfered and includes a screw driver slot for rotation. The right-hand end includes a bevel or chamfer 46 corresponding in shape and size to the heads of the fasteners received through the panels in apertures 43 or 44. A threaded cylindrical extension extends rectilinearly and coaxially outwardly from the taper or bevel 46 to provide a fastener for securing pin 40 to pin 50.

Pin 50 (FIG. 4) generally corresponds to the left-hand end of connecting pin 30 except that it includes only a single threaded securing aperture 54 in its body portion 52. The left-hand end 55, like the other pins, is beveled or chamfered while the right-hand end is cut at a right angle to the axis of the pin such that the pin will fit flush with the end surface of one of the panels in which it is inserted as is explained hereinafter. Aperture 54 receives threaded extension 47 from pin 40 when pin 40 is inserted in a panel such that that panel and the panel in which pin 50 is inserted are secured at right angles to one another (FIGS. 1 and 8).

Figure 5:
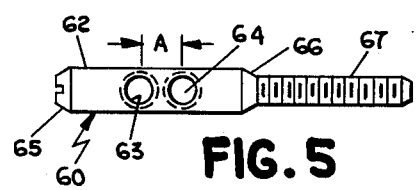
FIG. 5 is a side elevation of a fourth form of a connecting pin of the present invention.
Figure 3:
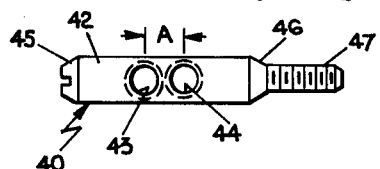
FIG. 3 is a side elevation of a second form of a connecting pin of the present invention.

As shown in FIG. 5, connecting pin 60 is similar to pin 40 and includes a right, circular cylindrical body 62, spaced apertures 63, 64, left and right tapered or beveled ends 65, 66 and a threaded, coaxial extension 67. Threaded extension 67 is approximately twice as long as extension 47 such that it will project through the entire thickness of one of the panels for receipt in the threaded, axial socket 72 in the end of pin 70.

Figure 6:
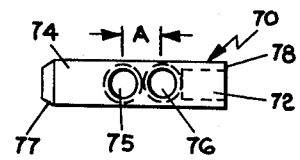
FIG. 6 is a side elevation of a fifth form of a connecting pin of the present invention.
Figure 9:
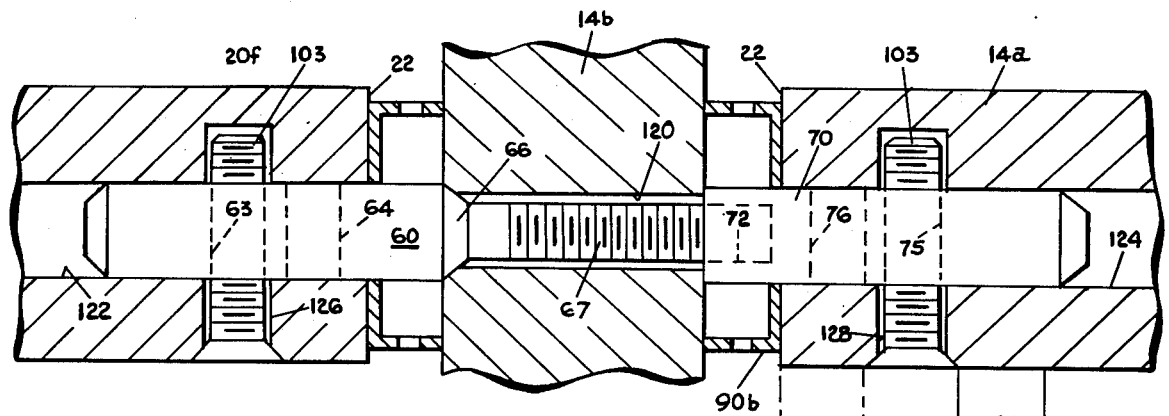
FIG. 9 is a fragmentary, sectional, plan view of three joined partition panel elements including shelving support brackets secured therebetween taken along plane IX—IX of FIG. 1 with a fourth panel element shown in phantom.

Pin 70 (FIG. 6) is received in another panel so that its panel and that containing pin 60 may be secured at right angles to a central panel as shown in FIG. 9. Pin 70 is generally similar to pin 50 and includes a rectilinear, right, circular, cylindrical body 74, spaced, threaded throughbores or apertures 75, 76, a beveled or tapered left-hand end 77, as well as the threaded socket 72 which extends axially into the nontapered end 78 as shown in FIG. 6.

As shown in FIGS. 12 and 13, the slotted channel brackets for supporting shelving along the partition panels 12–20 include two embodiments. Embodiment 80 is adapted to secure a panel to a wall or other surface or for capping or covering an exposed end edge of one of the panels in a partition arrangement while supporting shelving thereon as shown in FIG. 1. The second embodiment 90 is generally designed for insertion between two of the partition panel elements.

Figure 10:
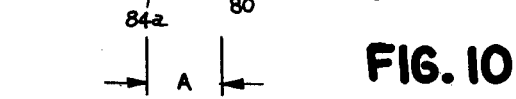
FIG. 10 is a fragmentary, sectional, plan view of one of the partition panel elements joined to a wall with a shelving support bracket secured therebetween.

As shown in FIGS. 10–12, bracket 80 includes a channel 82 having a base portion 83 extending between a pair of parallel side flanges 84a, 84b extending outwardly in the same direction from one side of the base. Each side flange 84a, 84b has a length which provides the bracket with an overall thickness equal to the distance A by which the fastener receiving apertures in the various connecting pins 30–70 are spaced axially apart. Each of the side flanges includes vertically aligned, regularly spaced slots 85 for receiving L-shaped flanges 27a of a cantilever-type shelving support arm 27 (FIG. 14). A series of connecting pin studs 86 extends normally outwardly from the inside of the channel base 83 and are welded or otherwise rigidly secured thereon. Pin studs 86 are similar to connecting pins 50 but include a pair of spaced, fastener-receiving apertures 87, 88 spaced apart along the axis of the right, cylindrical, circular pin body by a distance A. The outer free end of the pin stud is beveled or tapered at 89. The fastener-receiving apertures 87, 88 are located in the pin stud body outwardly beyond the plane of the ends of the side flanges 84a and 84b as shown in FIG. 12.

Embodiment 90 of the slotted channel bracket (FIGS. 7–9 and 13) is similar in all respects to bracket 80 except that it includes a series of circular apertures 92 extending through the center of its base 93 to allow connecting pins 30, 40, 60, or 70 to be inserted therethrough to secure any of partition panel elements 12–20 on either side of the bracket. It also includes side flanges having a length providing it with an overall thickness equivalent to distance A and a series of vertically aligned, vertically spaced slots 95 in each side flange for receipt of the flanges 27a of cantilever-type shelving support arms 27.

Figure 7:
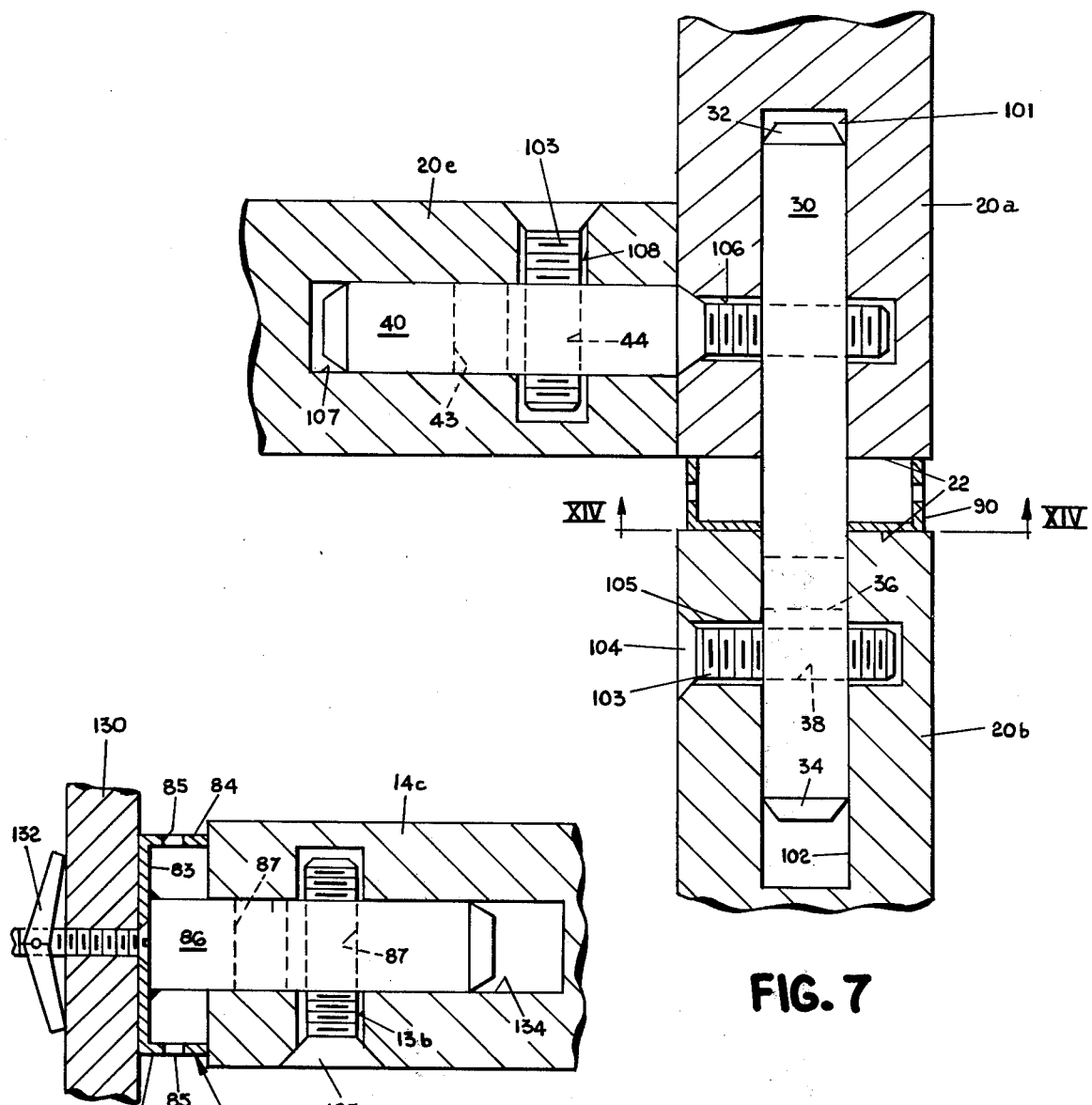
FIG. 7 is a fragmentary, sectional, plan view of three partition panel elements joined together with a shelving support bracket secured between two of the elements and taken along plane VII—VII of FIG. 1.

Referring now to FIGS. 7-9, three typical arrangements of the partition panel elements 12-20 are shown. In FIG. 7, panel elements 20a and 20b are arranged generally rectilinearly with one another with two of their end surfaces 22 facing each other and a channel bracket 90 inserted therebetween. A connecting pin 30 extends from a receiving aperture 101 in panel 20a through aperture 92 in base 83 of channel 90 into a receiving aperture 102 in panel 20b. A threaded screw 103 having an inwardly tapered head 104 is inserted through a securing aperture 105 extending at a right angle to receiving aperture 102 and communicating therewith. When connecting pin 30 is secured in panel 20a as will be described below by a fastener, and channel bracket 90 is inserted between end surfaces 22 of panels 20a, 20b, threaded aperture 38, which is closest to end 34 of pin 30, is in alignment with securing aperture 105. Thus, when channel 90 is between the panels, threaded aperture 36 is not used and in fact is spaced inwardly toward the channel 90 out of registry with aperture 105. Typically, as shown in FIG. 7, brackets 80 and 90 have a width less than the panel thickness so that they are recessed behind the side or end surfaces of the panels. Should channel bracket 90 be removed from between end surfaces 22, panel 20b is slid along pin 30 into abutment with the end surface of panel 20a, thereby automatically bringing securing aperture 105 into registry with threaded aperture 36 such that fastener 103 may be inserted therein. Accordingly, only the single securing aperture 105 is required to secure panels 20a, 20b together regardless of whether channel bracket 90 is inserted therebetween or not.

The end of pin 30 which is received in channel 20a and aperture 101 may be secured therein utilizing any type of fastening means. In the preferred system, however, a threaded fastener is inserted through a securing aperture 106 extending from a side surface of the panel at a right angle to the axis of aperture 101 and into communication therewith for receipt of a threaded fastener.

In the application shown in FIG. 7, a connecting pin 40 is utilized in place of a typical threaded screw such that an additional or third panel element 20c may be secured at a right angle in abutment with the side surface of panel 20a. In this case, no shelving channel bracket is secured between panels 20c and 20a. Accordingly, the securing aperture 108 extending from a side surface of panel 20c at a right angle to pin-receiving aperture 107 extending into the end surface of panel 20c is in registry with threaded aperture 44 of pin 40, not aperture 43. A threaded fastener 103 is received through aperture 108 and secured in threaded aperture 44 to fasten panel 20c against panel 20a. Should it be desired to utilize a channel bracket 90 between the panels 20a, 20c, panel 20c is merely slid outwardly along pin 40 with the spacing of apertures 43, 44 automatically bringing aperture 108 into registry with aperture 43 for receipt of fastener 103 when channel bracket 90 is included therebetween.

As shown in FIG. 8, another arrangement of the partition panels at right angles to one another may be formed using connecting pins 40 and 50. Connecting pin 50 is received in a pin-receiving aperture 110 formed in the end surface 22 of panel 20d. A securing aperture 112 extends at a right angle from a side surface of panel 20d into communication with receiving aperture 110. Similarly, a pin-receiving aperture 114 in one end of panel 20e receives the body portion 42 of pin 40, while its threaded extension 47 is inserted through aperture 112 and is secured in threaded pin aperture 54 in pin 50. Because a channel bracket 90 is inserted between end surface 22 of panel 20e and the side surface of panel 20d, a threaded fastener 103, inserted through securing aperture 116 which extends through a side surface of panel 20e and communicates with pin-receiving aperture 114 in panel 20e, is threaded into aperture 43 of a pin 40. Aperture 43 is farthest of apertures 43, 44 from panel 20d. Should it be desired to abut panel 20e and panel 20d against one another, channel bracket 90 may be removed and fastener 103 inserted through securing aperture 116 into threaded aperture 44 once panel 20e is slid up against panel 20d. A second threaded pin aperture is not required in pin 50 because a slotted bracket 90 is not secured at panel end 22 of panel 20d.

In the arrangement shown in FIG. 9, panels 20f and 14a are secured generally in rectilinear alignment with one another on either side of a third panel 14b. Panels 20f and 14a are spaced outwardly from panel 14b by the inclusion of channels 90a and 90b on either side of panel 14b. Panel 14b includes a throughbore or aperture 120 receiving therethrough the threaded extension 67 from connecting pin 60. Pin 60 is inserted in a pin-receiving aperture 122 extending into the end surface 22 of panel 20f. Extension 67 is threaded into the threaded socket 72 of connecting pin 70 which is received in pin-receiving aperture 124 formed in the end surface 22 of panel 14a. Since channel brackets 90a and 90b are included, threaded fasteners 103 are received through securing apertures 126, 128 which communicate with receiving apertures 122, 124, respectively, in threaded apertures 63 and 75. These apertures are the closest apertures to the free ends 65, 77 of the pins 60, 70, respectively. Should channel brackets 90a and 90b be removed, panels 20f and 14a would be slid into abutment with the side surfaces of panel 14b and threaded fasteners 103 would be received in threaded apertures 64 and 76 in those pins.

As shown in phantom in FIG. 9, it would also be possible to secure a fourth panel at right angles to panels 14a or panel 20f by substituting a connecting pin 40 for fastener 103 which secures pin 60 or 70. Such capability provides wide flexibility in the arrangements of partitions which can be provided and does not depend on one particular end of a connecting pin being available for use.

Referring to FIGS. 10 and 11, channel brackets 80 are used to secure the partition panels 12-20 to a wall surface or to cap the free end edges of such panels. In FIG. 10, a channel bracket 80 is secured with its base 83 flat against the wall surface of a typical plasterboard or sheet rock wall 130. Screws 132 are inserted through securing apertures provided through base 83 and include expandable wings or the like to form a secure retention of the channel brackets to the plasterboard in a vertical orientation. Side flanges 84a and 84b of bracket 80 extend outwardly as do the pin studs 86 which are received in corresponding pin-receiving apertures 134 extending into the end surface 22 of partition panel 14c. The end surface 22 abuts against the free end edges of the side flanges and is accordingly spaced from the wall 130 by the distance A. A threaded fastener 103 inserted through a securing aperture 136 communicating with pin-receiving aperture 134 from a side surface of panel 14c is threadedly secured in the outer threaded aperture 88 in pin stud 86 because of such spacing.

As shown in FIG. 11, a partition panel such as 14c may also be provided with an end recess 138 corresponding in shape and size to the channel bracket 90 for receipt of the same along the end edge of the panel. In such case, when the bracket 90 is secured to a wall 130 with fasteners such as 132 as described above, and pin studs 86 are received in receiving apertures 134, the end surface 22 of panel 14c will abut directly against wall 130 allowing fastener 103 to be inserted through securing aperture 136 into threaded aperture 87 in the pin stud instead of aperture 88. Such recess of the channel bracket provides a flush fit of the surface of the bracket with the end of the panel. It also provides a means for securing the panel directly against a wall when there is no necessity for supporting shelving along the panel side surfaces.

In each of the above arrangements, each of the securing apertures 105, 106, 108, 112, 116, 126, 128, and 136 may be provided in their respective panels with an inwardly tapered, countersunk area corresponding in shape and size to the inwardly tapered, head or beveled surface on the connecting pins 40, 60 or fasteners 103. As is described in commonly owned U.S. Pat. No. 3,884,002, such securing apertures have their center lines spaced to be slightly offset from the center lines of the threaded apertures in the various connecting pins when the panels are either in abutment with one another or have the slotted shelving support brackets therebetween. Such offset causes the tapered heads on the fasteners 103 or tapered beveled portions of the connecting pins 40, 60 to engage the countersunk areas and wedge or force the panels toward one another to form a secure, tight arrangement. Such a wedging system is fully described in U.S. Pat. No. 3,884,002, issued to Charles F. Logie on May 20, 1975, the disclosure of which is hereby incorporated by reference herein.

Accordingly, the present invention provides a system for joining, supporting, and arranging partition panel elements with one another and with walls and other similar surfaces and provides the flexibility for selective inclusion of shelving support brackets adjacent the end surfaces of the panels to support shelving along the side surfaces thereof. The connection apparatus utilizes the same securing apertures in the panels regardless of whether the shelving support brackets are included or not, while the connecting pins themselves include pairs of apertures spaced in a predetermined relationship to receive fasteners for securing the panels together in alternate fashion depending on the inclusion or removal of the shelving securing brackets.

While several forms of the invention have been shown and described, other forms will now be apparent to those skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows:

1. A partition system for joining a panel element to another panel element, wall, or the like comprising a first panel element having a receiving aperture extending into one surface thereof; at least one of a second panel element or wall; connecting pin means for connecting said panel to the said one of said second panel element or wall; securing means for securing said pin means to at least one of said second panel element or wall; said pin means extending into said receiving aperture in said first panel element, having a longitudinal axis, and including a pair of pin apertures spaced apart along said pin axis, said pin apertures being located in that portion of said connecting pin means which extends into said receiving aperture in said first panel element; a securing aperture extending through another surface of said first panel element and communicating with said receiving aperture in said first panel element; a fastener extending through said securing aperture and secured to said pin means in one of said two pin apertures in said pin means; said other pin aperture in said pin means adapted to receive said fastener therein through said securing aperture when a third element is secured between said one surface of said first panel element and the said one of said second panel or wall.

2. The partition system of claim 1 wherein said connecting pin means connects said first panel element to said second panel element and includes an elongated rod-like pin extending from said receiving aperture in said first panel element into a receiving aperture extending into one surface of said second panel element; said securing means including engaging means for engaging said pin in the receiving aperture of said second panel element.

3. The partition system of claim 2 wherein said engaging means include a second fastener extending through a securing aperture in another surface of said second panel element and secured to said pin.

4. The partition system of claim 3 wherein said second fastener includes an axial extension forming a second connecting pin means for connecting said other surface of said second panel element to another panel element; said extension extending into a receiving aperture in one surface of said other panel element, having an axis of elongation, and including a pair of pin apertures spaced apart along said pin axis; said other panel element including a third securing aperture extending through another surface of said other panel element and communicating with said receiving aperture in said other panel element; a third fastener extending through said third securing aperture and secured to said extension in one of said two pin apertures therein; said other pin aperture in said extension adapted to receive said third fastener therein through said third securing aperture when an additional element is secured between said other surface of said second panel element and said one surface of said other panel element.

5. The partition system of claim 3 wherein said second fastener threadedly engages a third pin aperture in said pin extending generally transverse to said pin axis and located in the portion of said pin received in said receiving aperture in said second panel element.

6. The partition system of claim 5 said securing aperture in said second panel element includes an inwardly tapered, countersunk area coaxial with said securing aperture at said other surface of said second panel element; said third pin aperture being threaded; said fastener being correspondingly threaded and including a tapered head engaging said countersunk area; the axis of said securing aperture and countersunk area being spaced farther from said one surface of said first panel element than is said third pin aperture when said fastener is threadedly received therein whereby tightening said fastener in said third pin aperture wedges said tapered head against said countersunk area and thus said second panel element toward said first panel element.

7. The partition system of claim 1 wherein said securing aperture includes an inwardly tapered, countersunk area coaxial therewith at said other surface of said first panel element; said pin apertures each being threaded; said fastener being correspondingly threaded and including a tapered head for engaging said countersunk area; the axis of said securing aperture and countersunk area being spaced farther from said one of said second panel element, wall, or the like than is said one pin aperture when said fastener is threadedly received therein whereby tightening said fastener in said pin aperture wedges said tapered head against said countersunk area and thus said first element toward said second panel element.

8. The partition system of claim 1 including wedging means associated with said fastener for wedging said first panel element axially of said connecting pin means and toward said second panel element, wall, or the like.

9. The partition system of claim 8 wherein said wedging means include a tapered head on said fastener.

10. The partition system of claim 1 wherein each of said two pin apertures is threaded, said fastener being correspondingly threaded for securement in one of said two pin apertures.

11. The partition system of claim 1 wherein said one pin aperture in which said fastener is received is the closest of said two pin apertures to said second panel element, wall, or the like.

12. The partition system of claim 1 including a third element interposed between said first panel element and at least one of said second panel element, wall, or the like; said fastener being received through said securing aperture and received in said other pin aperture in said pin means, said other pin aperture being the farthest of said two pin apertures from said second panel element, wall, or the like, and having its center line spaced from the center line of said one pin aperture by a distance equal to the width of said third element.

13. The partition system of claim 1 wherein the center lines of said pin apertures are spaced apart along said axis of said pin means by a distance equal to the width of the third element adapted to be secured between said first panel element and said second panel element, wall, or the like.

14. The partition system of claim 1 wherein a third element is interposed between said first panel element and a wall, said third element including an elongated channel bracket having spaced slots on either side flange thereof for receiving and holding cantilever shelving support arms or the like.

15. The partition system of claim 14 wherein said channel bracket is secured to a wall; said connecting pin means including a pin stud extending normally outwardly from said channel bracket; said two pin apertures being located on said pin stud outwardly of said channel bracket whereby said first panel element is secured to said wall when said fastener is inserted through said securing aperture in one of said two pin apertures in said pin stud.

16. The partition system of claim 15 wherein said one surface of said first panel element includes a recessed area receiving said channel bracket, said receiving aperture extending into said first panel element from said recessed area; said fastener being received in the pin aperture closest to said channel bracket.

17. The partition system of claim 15 wherein said fastener is received in the pin aperture farthest from said channel bracket, said channel bracket extending between said one surface of said first panel element and said wall.

18. The partition system of claim 1 wherein said connecting pin means is formed in two sections, one of said sections including a threaded, axial extension for passing through an aperture in a fourth panel element from one side to the other, the other of said sections including a threaded, axially extending hole in one end thereof for receiving said threaded extension such that panel elements may be secured on either side of said fourth panel element.

19. The partition system of claim 1 wherein said fastener includes an axial extension forming a second connecting pin means for connecting said other surface of said first panel element to another panel element; said extension extending into a receiving aperture in one surface of said other panel element, having an axis of elongation, and including a pair of pin apertures spaced apart along said pin axis; said other panel element including a second securing aperture extending through another surface of said other panel element and communicating with said receiving aperture in said other panel element; a second fastener extending through said second securing aperture and secured to said extension in one of said two pin apertures therein; said other pin aperture in said extension adapted to receive said second fastener therein through said second securing aperture when an additional element is secured between said other surface of said first panel element and said one surface of said other panel element.

20. A partition system comprising a panel element having a surface joined to a bracket, said bracket having at least one elongated pin stud extending outwardly thereof; said pin stud having an axis of elongation and a pair of pin apertures extending generally transverse to said axis; said panel element having a pin-receiving aperture extending into said surface and a securing aperture extending through another surface of said panel element and communicating with said receiving aperture; said pin stud extending into said receiving aperture with a fastener extending through said securing aperture and secured to said pin stud in one of said pin apertures to hold said bracket to said surface.

21. The partition system of claim 20 wherein said bracket abuts said surface of said panel; one of said pin apertures being spaced closer to said bracket than the other; said fastener being secured to said pin stud in said one pin aperture.

22. The partition system of claim 20 wherein said surface includes a recess which receives said bracket therein; one of said pin apertures being spaced closer to said bracket than the other; said fastener being secured to said pin stud in said other pin aperture.

23. The partition system of claim 20 wherein said panel is longer and taller than it is wide, said surface being an end surface and also being longer than it is wide; said bracket including an enlongated channel with its side flanges being of equivalent width and including a plurality of spaced slots therealong for receiving shelving support arms or the like; said pin stud extending normally outwardly from the base of said channel from between said side flanges; the center lines of said pin apertures being spaced apart by a distance equal to the width of said side flanges.

24. The partition system of claim 20 wherein said bracket includes means for securing said bracket between said panel element and another panel element, wall, surface, or the like.

* * * * *

UNITED STATES PATENT AND TRADEMARK OFFICE
CERTIFICATE OF CORRECTION

PATENT NO. : 4,012,880
DATED : March 22, 1977
INVENTOR(S) : Charles F. Logie

It is certified that error appears in the above-identified patent and that said Letters Patent are hereby corrected as shown below:

Column 3, line 32;
    "71 11" should be --7-11--;
Column 10, line 58;
    "one" should be --other--;
Column 10, line 63;
    "other" should be --one--;
Drawings, Fig. 10;
    "87" (right-hand most recitation) should be --88--.

Signed and Sealed this

Fourth Day of October 1977

[SEAL]

Attest:

RUTH C. MASON
*Attesting Officer*

LUTRELLE F. PARKER
*Acting Commissioner of Patents and Trademarks*